US009390666B2

(12) United States Patent
Oh et al.

(10) Patent No.: US 9,390,666 B2
(45) Date of Patent: Jul. 12, 2016

(54) DISPLAY DEVICE CAPABLE OF DRIVING AT LOW SPEED

(71) Applicant: LG Display Co., Ltd., Seoul (KR)

(72) Inventors: Daeseok Oh, Paju-si (KR); Bogun Seo, Paju-si (KR); Yonghwa Park, Paju-si (KR); Moonsoo Chung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 59 days.

(21) Appl. No.: 14/308,354

(22) Filed: Jun. 18, 2014

(65) Prior Publication Data

US 2015/0187334 A1 Jul. 2, 2015

(30) Foreign Application Priority Data

Dec. 30, 2013 (KR) ........................ 10-2013-0166662

(51) Int. Cl.
*G06F 3/038* (2013.01)
*G09G 3/36* (2006.01)
*G09G 3/20* (2006.01)

(52) U.S. Cl.
CPC ............ *G09G 3/3614* (2013.01); *G09G 3/2025* (2013.01); *G09G 2310/0224* (2013.01); *G09G 2320/0233* (2013.01); *G09G 2330/021* (2013.01); *G09G 2340/0435* (2013.01); *G09G 2340/14* (2013.01); *G09G 2350/00* (2013.01)

(58) Field of Classification Search
CPC .............. G09G 5/18; G09G 2330/027; G09G 2330/021; G09G 2360/08; G09G 3/2025; G09G 3/3614; G09G 2350/00; G09G 2310/0224; G09G 2320/0233; G09G 2340/0435; G09G 2340/14
USPC .......................................................... 345/204
See application file for complete search history.

(56) References Cited

U.S. PATENT DOCUMENTS

2006/0221001 A1* 10/2006 Matono .................... G09G 3/22
345/75.2

* cited by examiner

*Primary Examiner* — Gustavo Polo
(74) *Attorney, Agent, or Firm* — Fenwick & West LLP

(57) ABSTRACT

A display device capable of driving at low speed includes a display panel, on which display lines each including a plurality of pixels are formed, a driver unit for driving the pixels, and a timing controller which controls an operation of the driver unit and includes a first control logic unit and a second control logic unit. When a mode conversion control signal of an on-level is input during a normal drive, in which a length of one frame is set to P, the first control logic unit expands a length of one frame for a low speed drive to (n×P), where n is a positive integer equal to or greater than 2, assigns a length P to each of n sub-frames included in the one frame for the low speed drive, and controls the operation of the driver unit in an interlaced low speed driving scheme.

10 Claims, 15 Drawing Sheets

(A) Related art (B) Present invention

DISPLAY DEVICE CAPABLE OF DRIVING AT LOW SPEED

CROSS-REFERENCE TO RELATED APPLICATION

This application claims the benefit of Korea Patent Application No. 10-2013-0166662 filed on Dec. 30, 2013, which is incorporated herein by reference for all purposes as if fully set forth herein.

BACKGROUND OF THE INVENTION

1. Field of the Invention

Embodiments of the disclosure relate to a display device capable of driving at low speed.

2. Discussion of the Related Art

Display devices have been used in various display units, such as portable information devices, office devices, computers, and televisions.

Methods for reducing power consumption of the display device include low speed driving technology. The low speed driving technology is to change a frame frequency (e.g., a driving frequency) based on a change in the amount of data. In a stop image, in which there is no change of data, the low speed driving technology refreshes the screen of the display device using a frame frequency less than an input frame frequency (for example, a normal frame frequency of 60 Hz). In a moving image, in which there is a change in data, the screen of the display device is refreshed using a normal driving method based on the input frame frequency. The display device may change the frame frequency in response to a panel self refresh (PSR) control signal received from a system. For example, when the PSR control signal is input at an on-level in conformity with the stop image, the display device may reduce the frame frequency to a frequency less than 60 Hz. Further, when the PSR control signal is input at an off-level in conformity with the moving image, the display device may keep the frame frequency at 60 Hz.

The low speed driving technology may be implemented through an interlaced driving scheme. In the interlaced low speed driving scheme, one frame is time-divided into a plurality of sub-frames, and gate lines are interlace-driven in each sub-frame. In the interlaced driving scheme, as the number of sub-frames increases, a length of one frame increases. Hence, the frame frequency is reduced. As the frame frequency gradually decreases from 60 Hz for the low speed drive, a data transition frequency (used in the supply of a data voltage) of a source driver decreases. Hence, power consumption is reduced.

However, as described above, the display device capable of driving at low speed may go through a momentary screen flicker (e.g., a glitch phenomenon) generated when the frame frequency changes. The glitch phenomenon is generated when the frame frequency changes for a normal drive during the interlaced low speed drive. As an example of the glitch phenomenon, FIG. 1 shows the glitch phenomenon generated when the frame frequency changes to 60 Hz during the 30 Hz interlaced low speed drive.

FIG. 2 shows a luminance change (e.g., a transient increase in a mean luminance level) measured by a photodiode when the frame frequency changes from 30 Hz to 60 Hz. As shown in FIG. 2, there is a luminance difference between an Nth frame driven at 30 Hz and (N+1)th frame driven at 60 Hz.

A provoking cause of the glitch phenomenon is described below with reference to FIG. 3.

In 30 Hz interlaced driving state, during a first sub-frame SF1 of the Nth frame, odd-numbered display lines L#1, L#3, L#5, and L#7 are sequentially scanned and are charged to a new data voltage, and even-numbered display lines L#2, L#4, L#6, and L#8 are not scanned and are held at a previously charged data voltage. During a second sub-frame SF2 of the Nth frame, the even-numbered display lines L#2, L#4, L#6, and L#8 are sequentially scanned and are charged to a new data voltage, and the odd-numbered display lines L#1, L#3, L#5, and L#7 are not scanned and are held at a previously charged data voltage. In 60 Hz normal driving state, during one frame, all of the display lines L#1 to L#8 are sequentially scanned and are charged to a new data voltage. A polarity of the data voltage charged to the corresponding display line is inverted when the corresponding display line is scanned in a cycle of one frame period.

In this state, as shown in FIG. 3, when the PSR control signal is input at the off-level between the first sub-frame SF1 and the second sub-frame SF2 of the Nth frame, a related art display device omits the second sub-frame SF2 of the Nth frame and immediately changes the frame frequency from 30 Hz to 60 Hz. In other words, the related art display device scans the odd-numbered display lines L#1, L#3, L#5, and L#7 in the 30 Hz driving state and then immediately changes the frame frequency from 30 Hz to 60 Hz in response to the PSR control signal of the off-level. Hence, in the related art display device, when the frame frequency is changed to 60 Hz, a polarity repeat phenomenon is generated in the even-numbered display lines L#2, L#4, L#6, and L#8. A charge amount of the display lines, on which the same polarity pattern is repeated, is more than a charge amount of the display lines, on which the polarity pattern is inverted, with respect to the same data voltage. Thus, in the related art display device, when the frame frequency is changed to 60 Hz, an entire luminance increases because of some display lines, in which the polarity repeat phenomenon is generated. This is perceived as the glitch phenomenon.

SUMMARY

Embodiments of the disclosure provide a display device capable of driving at low speed, which changes a frame frequency in response to a mode conversion control signal received from the outside, capable of preventing the generation of a glitch phenomenon when a low speed driving mode is changed to a normal driving mode.

In one aspect, a display device capable of driving at low speed changes a frame frequency in response to a mode conversion control signal received from the outside. The display device comprises a display panel, on which display lines each including a plurality of pixels are formed. The display device also comprises a driver unit configured to drive the plurality of pixels, and a timing controller configured to control an operation of the driver unit and display an image on the display panel. The timing controller includes a first control logic unit and a second control logic unit. When the mode conversion control signal of an on-level is input during a normal drive, in which a length of one frame is set to P, the first control logic unit expands a length of one frame for a low speed drive to (n×P), where n is a positive integer equal to or greater than 2, assigns a length P to each of n sub-frames included in the one frame for the low speed drive, and controls the operation of the driver unit in an interlaced low speed driving scheme. When the mode conversion control signal of an off-level is input in a predetermined sub-frame of the one frame for the low speed drive during an interlaced low speed drive, the second control logic unit detects a next sub-frame of the predetermined sub-frame as a conversion standby sub-frame, controls the operation of the driver unit, and scans all of display lines, which are not scanned until the predetermined sub-frame within the one frame for the low speed drive, in the conversion standby sub-frame.

The second control logic unit includes an off-time detector which has a frame counter and decides how many sub-frames of the one frame exist before the predetermined sub-frame of the one frame for the low speed drive.

When the predetermined sub-frame is decided as a previous sub-frame of a last sub-frame of the one frame for the low speed drive, the second control logic unit controls the operation of the driver unit in a normal driving manner for the normal drive immediately after the conversion standby sub-frame is finished.

When the predetermined sub-frame is decided as a last sub-frame of the one frame for the low speed drive, the second control logic unit skips a detection operation of the conversion standby sub-frame and controls the operation of the driver unit in a normal driving manner for the normal drive immediately after the predetermined sub-frame is finished.

The driver unit includes a gate driver for driving gate lines of the display panel and a source driver for driving data lines of the display panel. For the interlaced low speed drive, the first control logic unit groups the gate lines into n gate groups, controls an operation of the gate driver in each sub-frame, completes a scanning operation of the gate lines belonging to the corresponding gate group during a scan period occupying a portion of one sub-frame, generates a buffer operation control signal, and shuts off a driving power source applied to buffers of the source driver based on the buffer operation control signal during a skip period corresponding to a remaining period excluding the scan period from the one sub-frame.

For the interlaced low speed drive, the first control logic unit changes a polarity control signal, expands a polarity inversion period of a data voltage, which will be input to the display panel, to one frame for the low speed drive, controls an operation of the source driver, outputs the data voltage to the data lines during the scan period, and skips an output of the data voltage during the skip period.

The source driver outputs the data voltages of opposite polarities through adjacent output channels in a column inversion scheme and inverts a polarity of each output channel in a cycle of one frame for the low speed drive in response to the polarity control signal.

The scan period occupies 1/n of each sub-frame, and the skip period following the scan period occupies (n−1)/n of each sub-frame.

The first control logic unit sets one gate time required to scan one gate line in each sub-frame to '1H' defined by the length P of one sub-frame/the number of gate lines and sets a distance between rising edges of adjacent scan pulses scanned in an interlaced scheme in one sub-frame to '1H', so as to secure the skip period in the interlaced low speed drive.

A scanning operation of the gate driver and a data voltage supply operation of the source driver are skipped during the skip period of each sub-frame.

BRIEF DESCRIPTION OF THE DRAWINGS

The accompanying drawings, which are included to provide a further understanding of the invention and are incorporated in and constitute a part of this specification, illustrate embodiments of the disclosure and together with the description serve to explain the principles of the disclosure. In the drawings.

DETAILED DESCRIPTION OF THE ILLUSTRATED EMBODIMENTS

Reference will now be made in detail to embodiments of the disclosure, examples of which are illustrated in the accompanying drawings. Wherever possible, the same reference numbers will be used throughout the drawings to refer to the same or like parts.

Exemplary embodiments of the disclosure are described, for instance, with reference to FIGS. 4 to 15.

Figure 4:
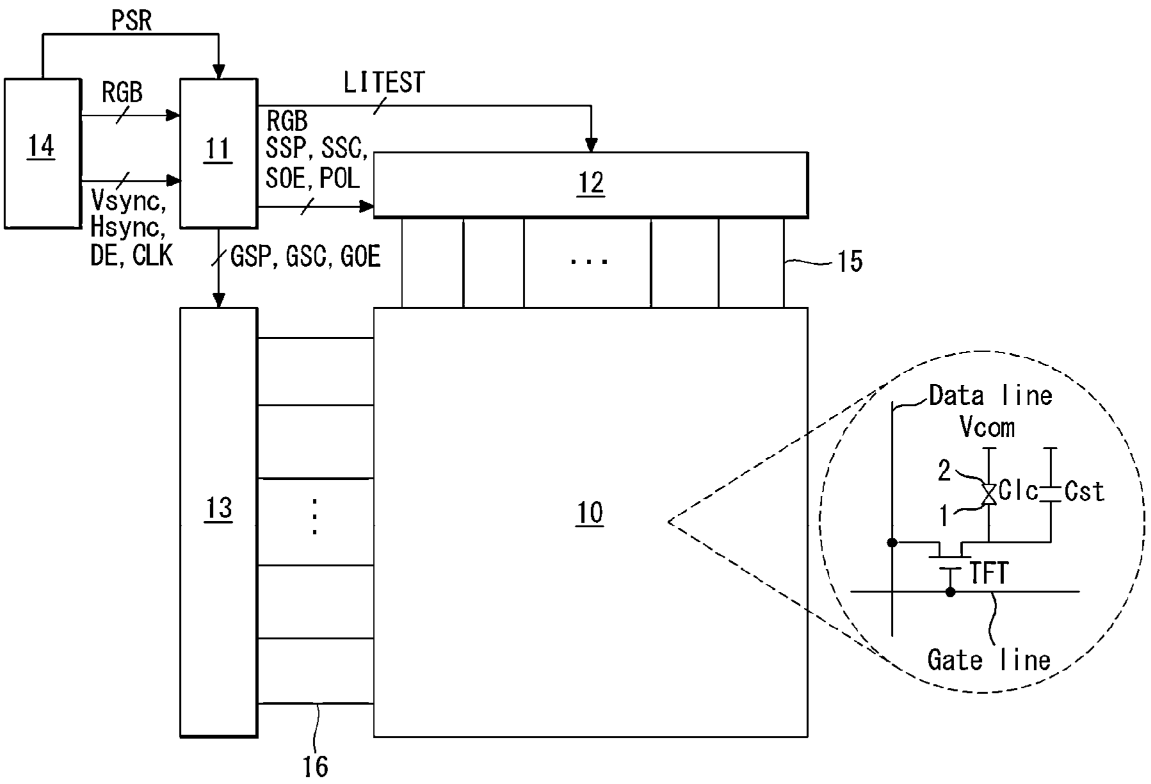
FIG. 4 is a block diagram of a display device according to an embodiment of the disclosure.
Figure 5:
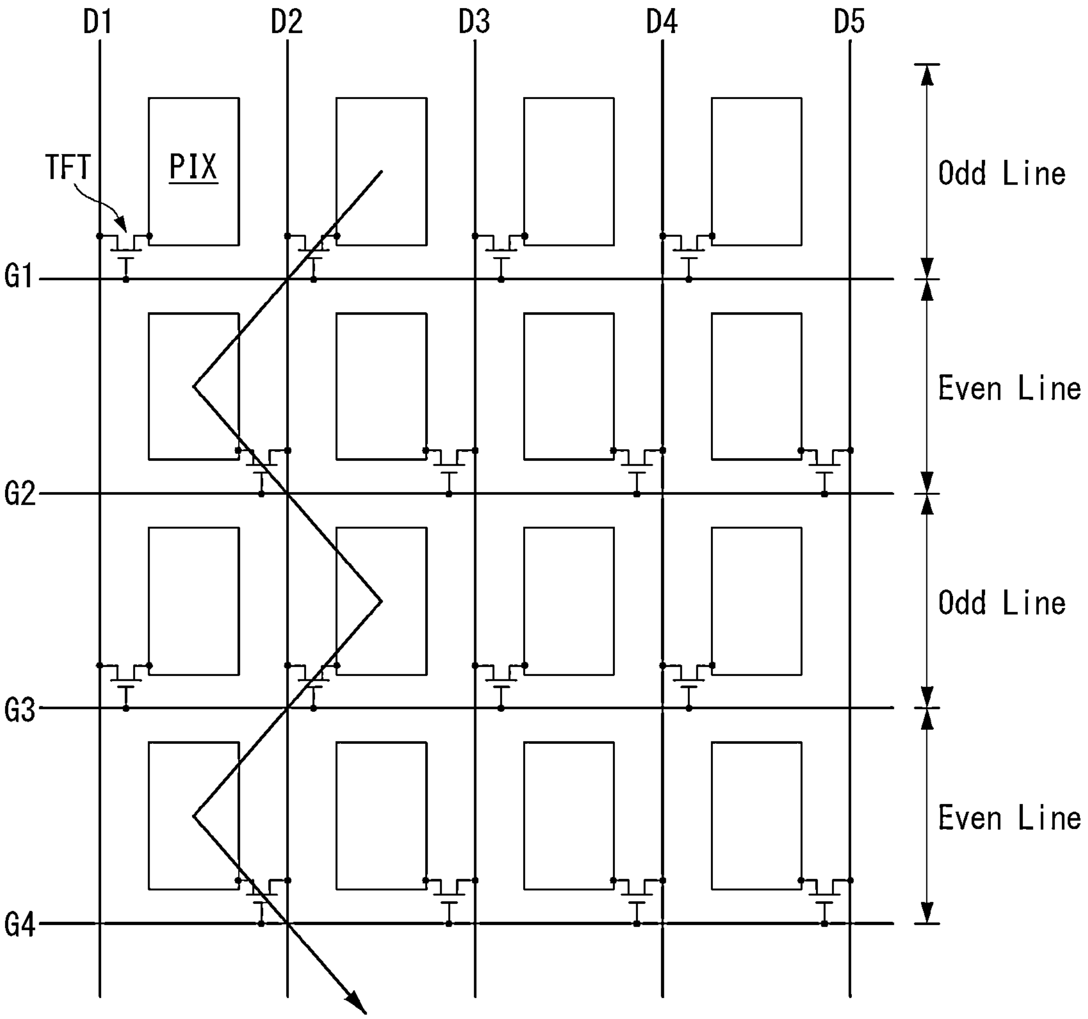
FIG. 5 illustrates a connection structure of pixels applied to a display device according to an embodiment of the disclosure.

FIG. 4 is a block diagram of a display device capable of driving at low speed according to an embodiment of the disclosure. FIG. 5 shows a connection structure of pixels applied to the display device according to the embodiment of the disclosure.

As shown in FIG. 4, the display device capable of driving at low speed may be implemented as a flat panel display, such as a liquid crystal display (LCD), a field emission display (FED), a plasma display panel (PDP), an organic light emitting display, or an electrophoresis display (EPD). In the following description, the liquid crystal display is used as an example of the flat panel display. Other flat panel displays may alternatively be used.

The display device according to one embodiment includes a display panel 10, a timing controller 11, a source driver 12, a gate driver 13, and a host system 14. The source driver 12 and the gate driver 13 constitute a driver unit.

The display panel 10 includes a lower glass substrate, an upper glass substrate, and a liquid crystal layer formed between the lower glass substrate and the upper glass substrate.

A pixel array is formed on the lower glass substrate of the display panel 10. The pixel array includes liquid crystal cells (i.e., pixels) Clc formed at crossings of data lines 15 and gate lines 16, thin film transistors (TFTs) connected to pixel electrodes 1 of the pixels, common electrodes 2 opposite the pixel electrodes 1, and storage capacitors Cst. Each liquid crystal cell Clc is connected to the TFT and is driven by an electric field between the pixel electrode 1 and the common electrode 2. Black matrixes, red, green, and blue color filters, etc. are formed on the upper glass substrate of the display panel 10. Polarizing plates are respectively attached to the upper and lower glass substrates of the display panel 10. Alignment layers for setting a pre-tilt angle of liquid crystals are respectively formed on the upper and lower glass substrates of the display panel 10.

The common electrodes 2 are formed on the upper glass substrate in a vertical electric field driving manner such as a twisted nematic (TN) mode and a vertical alignment (VA) mode. The common electrodes 2 are formed on the lower glass substrate along with the pixel electrodes 1 in a horizontal electric field driving manner such as an in-plane switching (IPS) mode and a fringe field switching (FFS) mode.

The display panel 10 applicable to the embodiment of the disclosure may be implemented in any liquid crystal mode including the TN mode, the VA mode, the IPS mode, the FFS mode, etc. The liquid crystal display according to the embodiment of the invention may be implemented as any type liquid crystal display including a transmissive liquid crystal display, a transflective liquid crystal display, and a reflective liquid crystal display. The transmissive liquid crystal display and the transflective liquid crystal display require a backlight unit. The backlight unit may be implemented as a direct type backlight unit or an edge type backlight unit.

As shown in FIG. 5, the display device may design a connection structure of the pixels in a Z-inversion scheme and may control polarities of data voltages output from the source driver 12 in a column inversion scheme, as a method for reducing power consumption. In FIG. 5, reference numerals D1 to D5 denote data lines to which the data voltage is supplied, and reference numerals G1 to G4 denote gate lines to which a scan pulse is supplied. In the pixel connection structure of the Z-inversion scheme, each of the pixels on odd-numbered display lines may be connected to the data line through the TFT and may be disposed on the right side of the data line, and each of the pixels on even-numbered display lines may be connected to the data line through the TFT and may be disposed on the left side of the data line. The source driver 12 increases a polarity inversion period of the data voltage output through one output channel to one frame using the column inversion scheme. Thus, the pixels, which are disposed in a zigzag shape based on the same data line (for example, D2) in a vertical direction, receive the data voltage of the same polarity. The display device may reduce the power consumption while controlling a display polarity in a dot inversion scheme based on the pixel connection structure and a polarity control method of the data voltage.

Referring again to FIG. 4, the timing controller 11 receives digital video data RGB of an input image from the host system 14 through a low voltage differential signaling (LVDS) interface and supplies the digital video data RGB of the input image to the source driver 12 through a mini LVDS interface. The timing controller 11 arranges the digital video data RGB received from the host system 14 in conformity with disposition configuration of the pixel array and then supplies the arranged digital video data RGB to the source driver 12.

The timing controller 11 receives timing signals, such as a vertical sync signal Vsync, a horizontal sync signal Hsync, a data enable signal DE, and a dot clock CLK, from the host system 14 and generates control signals for controlling operation timings of the source driver 12 and the gate driver 13. The control signals include a gate timing control signal for controlling operation timing of the gate driver 13 and a source timing control signal for controlling operation timing of the source driver 12.

The gate timing control signal includes a gate start pulse GSP, a gate shift clock GSC, a gate output enable signal GOE, etc. The gate start pulse GSP is applied to a gate driver integrated circuit (IC) generating a first scan pulse and controls the gate driver IC so that the first scan pulse is generated. The gate shift clock GSC is commonly input to gate driver ICs of the gate driver 13 and shifts the gate start pulse GSP. The gate output enable signal GOE controls an output of the gate driver ICs.

The source timing control signal includes a source start pulse SSP, a source sampling clock SSC, a polarity control signal POL, a source output enable signal SOE, etc. The source start pulse SSP controls data sampling start timing of the source driver 12. The source sampling clock SSC controls sampling timing of data in the source driver 12 based on its rising or falling edge. The polarity control signal POL controls polarities of the data voltages sequentially output from each output channel of the source driver 12. The source output enable signal SOE controls output timing of the source driver 12.

The timing controller 11 receives a mode conversion control signal from the host system 14 and changes a frame frequency for controlling an operation of the driver units 12 and 13 including the source driver 12 and the gate driver 13 in response to the mode conversion control signal, thereby making it possible to drive the display panel 10 in a normal driving mode or an interlaced low speed driving mode. A panel self refresh (PSR) control signal may be selected as the mode conversion control signal. The host system 14 includes various known image decision means and thus may decide whether the input image is a stop image or a moving image. The host system 14 may generate the PSR control signal at an on-level when the stop image is input, and may generate the PSR control signal at an off-level when the moving image is input.

The timing controller 11 controls the operation of the driver units 12 and 13 in conformity with the normal driving mode, in which the frame frequency is a reference value, in response to the PSR control signal of the off-level. The embodiment of the disclosure is described using 60 Hz as an example of the reference value for the sake of brevity and ease of reading, but is not limited thereto. The reference value may vary depending on a model and a resolution of the display panel, etc. Other values may be used for the reference value. In the normal driving mode, the source timing control signal and the gate timing control signal are generated based on the frame frequency of 60 Hz.

The timing controller 11 controls the operation of the driver units 12 and 13 in conformity with the interlaced low speed driving mode, in which the frame frequency is less (or slower) than 60 Hz, in response to the PSR control signal of the on-level. In the interlaced low speed driving mode, the source timing control signal and the gate timing control signal are generated based on the frame frequency of 60/n Hz, where n is a positive integer equal to or greater than 2.

The timing controller 11 includes a first control logic unit for implementing the interlaced low speed driving mode and a second control logic unit for suppressing a glitch phenomenon when the interlaced low speed driving mode is converted into the normal driving mode. This is described in detail below.

The source driver 12 includes a shift register, a latch array, a digital-to-analog converter, an output circuit, and the like. The source driver 12 latches the digital video data RGB in response to the source timing control signal and converts the latched digital video data RGB into positive and negative analog gamma compensation voltages. The source driver 12 then supplies the data voltages, of which polarities are inverted every a predetermined period of time, to the data lines 15 through a plurality of output channels. The output circuit includes a plurality of buffers. The buffers are connected to the output channels of the source driver 12, and the output channels are respectively connected to the data lines 15. The source driver 12 changes the polarity of the data voltage output from each output channel through the column inversion scheme in response to the polarity control signal POL received from the timing controller 11. According to the column inversion scheme, the polarity of the data voltage output through the same output channel is inverted in a cycle of one frame period. Polarities of the data voltages output through the adjacent output channels in the same frame period are opposite to each other.

The gate driver 13 supplies the scan pulse to the gate lines 16 in response to the gate timing control signal using a shift register and a level shifter. The gate driver 13 supplies the scan pulse to the gate lines 16 in a line sequential manner in the normal driving mode and supplies the scan pulse to the gate lines 16 in an interlaced scheme in the interlaced low speed driving mode. The shift register of the gate driver 13 may be directly formed on the lower glass substrate of the display panel 10 through a gate driver-in-panel (GIP) process.

Figure 6:
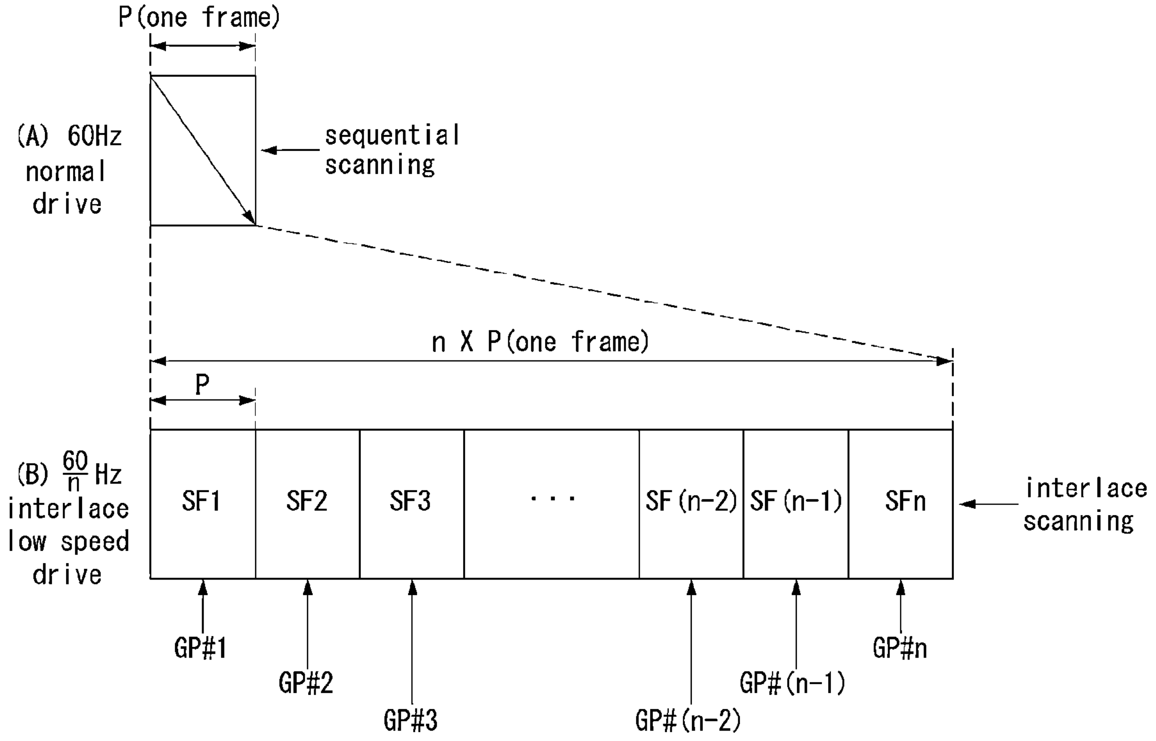
FIGS. 6 and 7 illustrate an operation of a timing controller for an interlaced low speed drive according to one embodiment.
Figure 7:
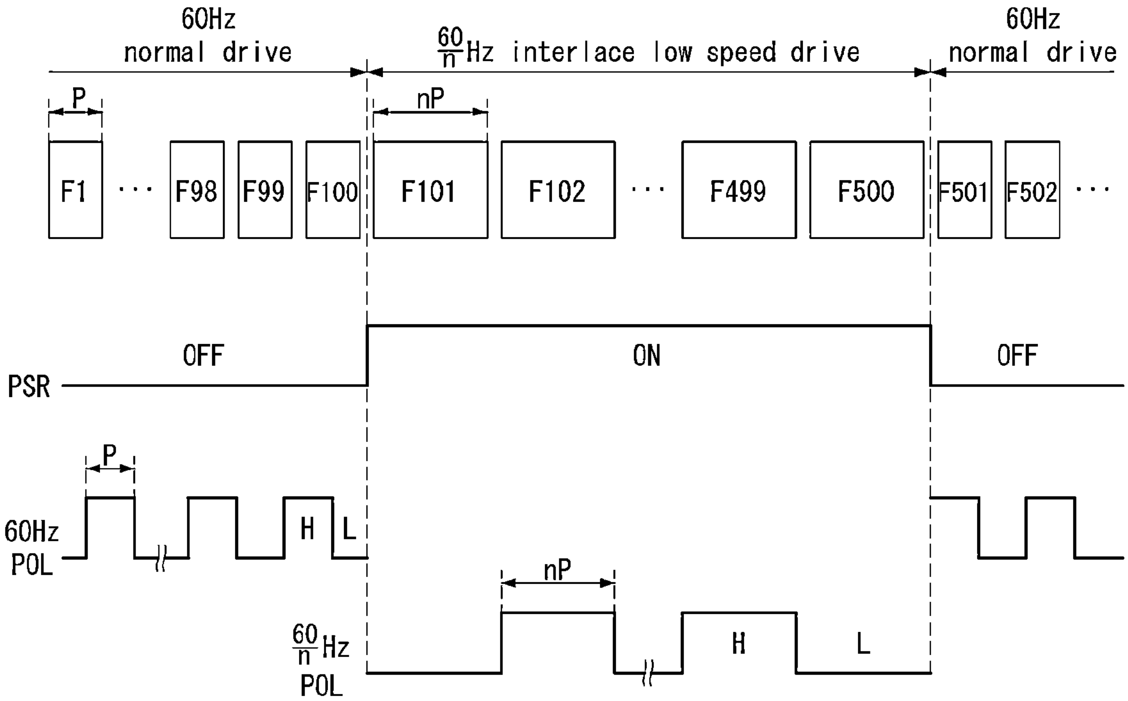
Figure 8:
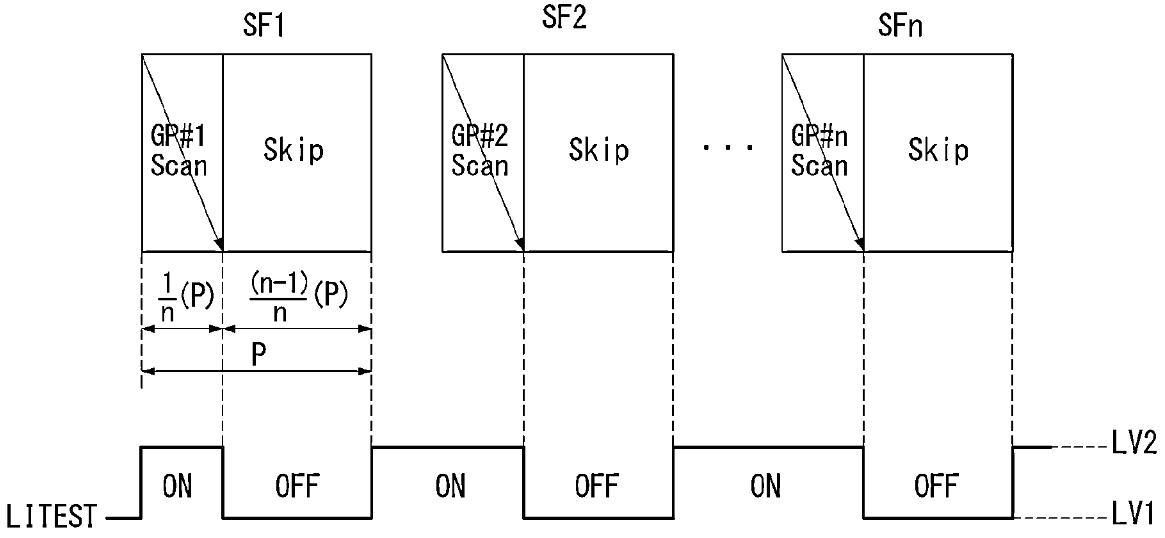
FIG. 8 illustrates a principle of an interlaced low speed drive according to one embodiment implemented through a scan drive and a skip drive.
Figure 9:
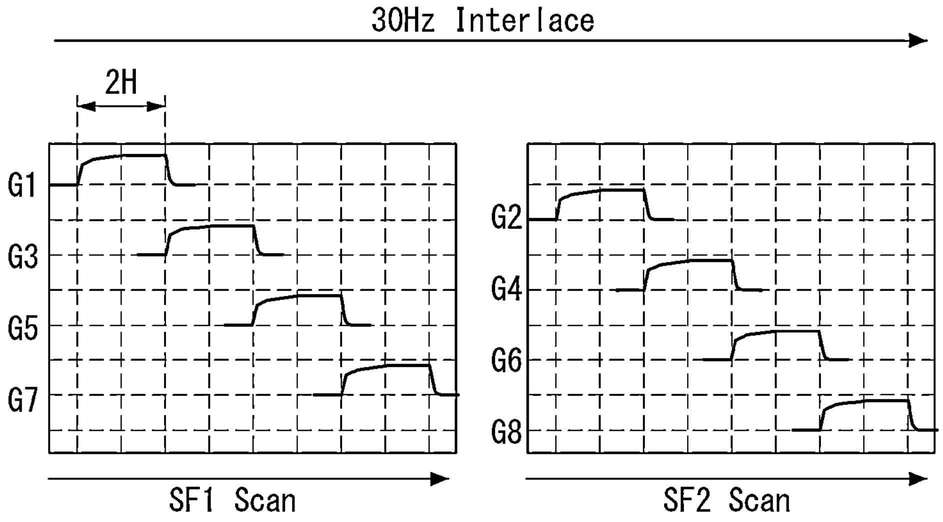
FIG. 9 shows an example of setting one gate time so as to perform a scan drive and a skip drive.
Figure 9:
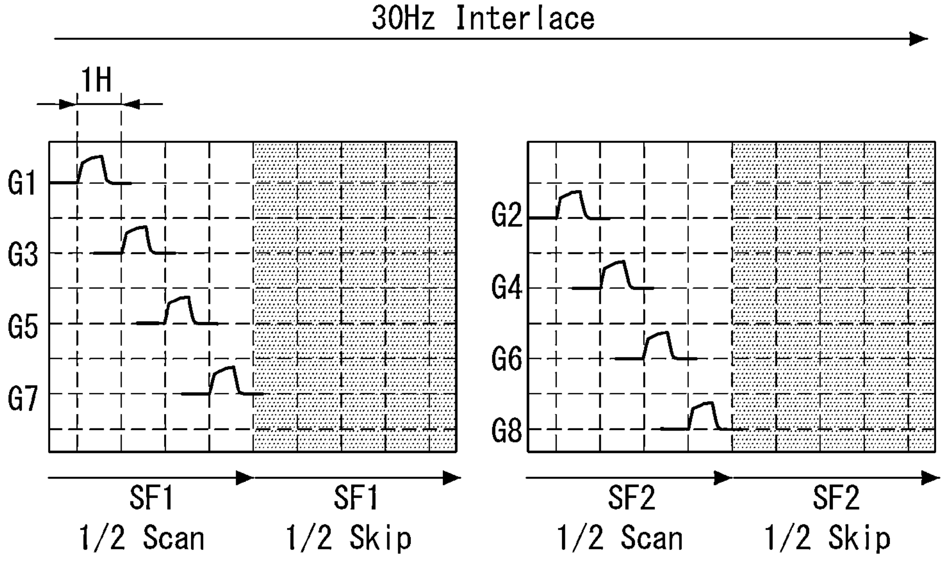

FIGS. 6 and 7 illustrate an operation of the timing controller for an interlaced low speed drive according to one embodiment. FIG. 8 illustrates a principle of the interlaced low speed drive according to one embodiment implemented by a scan drive and a skip drive. FIG. 9 shows an example of setting one gate time so that the scan drive and the skip drive can be performed.

As shown in FIG. 6, when the PSR control signal of the on-level is input during the normal drive, in which a length of one frame is set to P (e.g., 1/60 second), the first control logic unit of the timing controller 11 expands a length of one frame for the low speed drive to (n×P), where n is a positive integer equal to or greater than 2. The first control logic unit assigns a length corresponding to 'P' to each of n sub-frames included in the one frame for the low speed drive and then controls the operation of the driver units 12 and 13 in the interlaced low speed driving scheme.

The first control logic unit groups the gate lines 16 (shown in FIG. 4) into n gate groups GP#1 to GP#n. As shown in FIG. 8, the first control logic unit causes the n gate groups GP#1 to GP#n to respectively correspond to n sub-frames SF1 to SFn according to the driving order and interlace-drives the gate lines 16.

The first control logic unit controls the operation of the gate driver 13 in each sub-frame and completes the sequential scan of the gate lines belonging to the corresponding gate group during 1/n period (hereinafter referred to as a scan period P/n) of the one sub-frame. Further, the first control logic unit generates a buffer operation control signal LITEST and shuts off a driving power source (for example, a high potential driving voltage and a ground level voltage) applied to the buffers of the source driver 12 during a remaining period (n−1)/n (hereinafter referred to as a skip period P(n−1)/n) excluding the scan period P/n from the one sub-frame. Hence, the interlaced low speed drive is implemented.

For the interlaced low speed drive, the first control logic unit changes the polarity control signal POL (shown in FIG. 4) and expands a polarity inversion period of the data voltage, which will be input to the display panel 10, to one frame period (n×P) for the low speed drive. Further, the first control logic unit outputs the data voltage to the data lines 15 during the scan period P/n and then skips the output of the data voltage during the skip period P(n−1)/n through the control of the operation of the source driver 12.

In other words, as shown in FIG. 8, the first control logic unit controls the operation of the gate driver 13 during the scan period P/n of the first sub-frame SF1 having the length P and sequentially scans the gate lines 16 belonging to the first gate group GP#1. Further, the first control logic unit controls the operation of the source driver 12 and supplies the data voltage synchronized with the scan of the first gate group GP#1 to the data lines 15. As shown in FIG. 8, in the same manner as the first sub-frame SF1, the first control logic unit controls the operation of the gate driver 13 during the scan period P/n of the nth sub-frame SFn having the length P and sequentially scans the gate lines 16 belonging to the nth gate group GP#n. Further, the first control logic unit controls the operation of the source driver 12 and supplies the data voltage synchronized with the scan of the nth gate group GP#n to the data lines 15.

As shown in FIG. 8, the first control logic unit skips the scan operation of the gate driver 13 and the data voltage supply operation of the source driver 12 during the skip period P(n−1)/n except the scan period P/n (assigned to the scan operation) from each of the first to nth sub-frames SF1 to SFn each having the length P.

Figure 10:
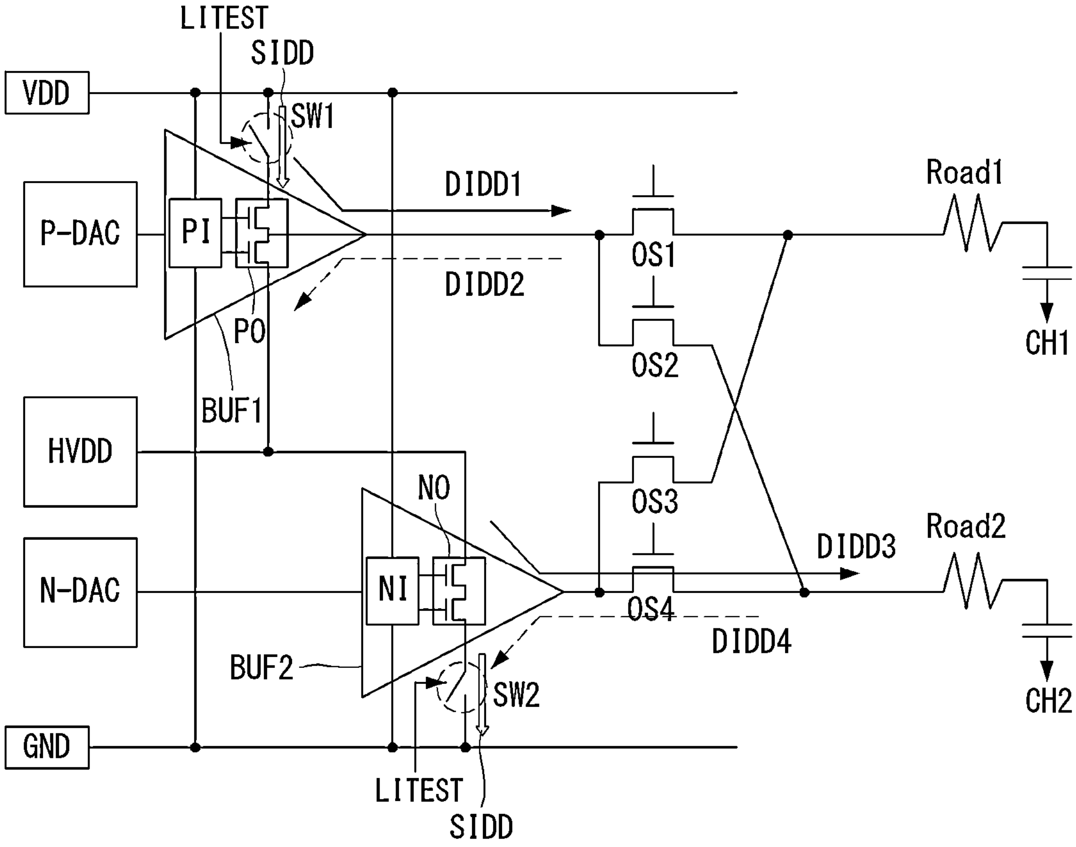
FIG. 10 illustrates a configuration of switches for removing a static current flowing in buffers of a source driver.

As shown in FIG. 8, the first control logic unit generates the buffer operation control signal LITEST at an on-level LV2 during the scan period P/n of each of the n sub-frames SF1 to SFn and generates the buffer operation control signal LITEST at an off-level LV1 during the skip period P(n−1)/n of each of the n sub-frames SF1 to SFn, thereby controlling switching operations of the first and second switches SW1 and SW2 of the source driver 12 shown in FIG. 10. The driving power source (for example, the high potential driving voltage and the ground level voltage) applied to the buffers of the source driver 12 is not shut off when the buffer operation control signal LITEST is generated at the on-level LV2, but is shut off when the buffer operation control signal LITEST is generated at the off-level LV1. The first control logic unit controls the operation of the source driver 12, so that the drive of the source driver 12 is skipped during the skip period P(n−1)/n of each of the n sub-frames SF1 to SFn. Further, the first control logic unit shuts off the driving power source applied to the source driver 12 and removes a static current flowing in the buffers of the source driver 12. Hence, power consumption of the source driver 12 is greatly reduced.

FIG. 7 shows an input level of the PSR control signal and an inversion period of the polarity control signal POL when $101^{th}$ to $500^{th}$ frames (F101 to F500) operate in the interlaced low speed driving mode and the remaining frames operate in the normal driving mode. As shown in FIG. 7, a polarity inversion period of the data voltage output by the source driver 12 is one frame period P for the normal drive in the normal driving mode and is expanded to one frame period (n×P) for the low speed drive in the interlaced low speed driving mode.

The first control logic unit sets one gate time required to scan one gate line in each of the sub-frames SF1 to SFn to '1H' defined by a length P of one sub-frame/the number of gate lines and also sets a distance between rising edges of the adjacent scan pulses scanned in the interlaced scheme in one sub-frame to '1H', so as to secure the skip period P(n−1)/n in the interlaced low speed drive.

In other words, referring to FIG. 9, in the related art, one gate time (indicating a charge time of pixels disposed on one display line) required to scan one gate line in 60/n Hz interlaced low speed drive is n times longer than one gate time '1H' (herein, defined by the length P of one sub-frame/the number of gate lines) in the 60 Hz normal drive. On the other hand, in the embodiment of the disclosure, one gate time in the 60/n Hz interlaced low speed drive is set to the same value '1H' as the normal drive. For example, as shown in FIG. 9, in 30 Hz interlaced low speed drive, in which one frame is time-divided into two sub-frames SF1 and SF2, one gate time was set to 2H in the related art, but one gate time is set to 1H in the embodiment of the disclosure. Further, a rising time of each scan pulse in the embodiment of the disclosure is earlier than the related art by 1H. Hence, the embodiment of the invention can perform a high speed scanning operation (indicating the sequential scanning operation of all of the gate lines assigned to a sub-frame using only a portion of the sub-frame) in each sub-frame.

Figure 11:
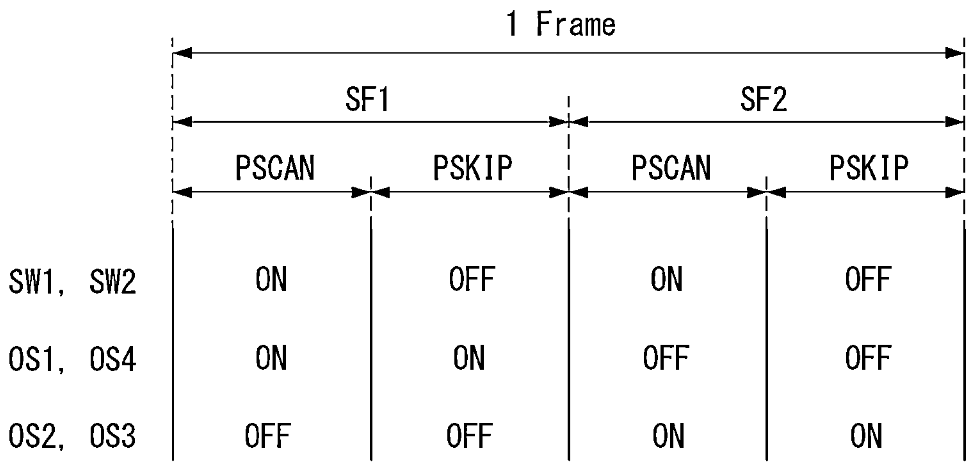
FIG. 11 illustrates a switching operation of switches shown in FIG. 10 in scan periods and skip periods of first and second sub-frames during 30 Hz interlaced low speed drive.

FIG. 10 shows a partial configuration of the source driver 12 (e.g., of FIG. 4). FIG. 11 illustrates a switching operation of switches shown in FIG. 10 in scan periods and skip periods of first and second sub-frames in the 30 Hz interlaced low speed drive.

As shown in FIG. 10, the source driver 12 includes a first digital-to-analog converter P-DAC for converting the input digital video data into a positive gamma compensation voltage, a first buffer BUF1 for buffering and outputting the positive gamma compensation voltage, a second digital-to-analog converter N-DAC for converting the input digital video data into a negative gamma compensation voltage, and a second buffer BUF2 for buffering and outputting the negative gamma compensation voltage.

A high potential driving voltage VDD, a ground level voltage GND, and a driving voltage HVDD (hereinafter referred to as "middle potential driving voltage" and having a middle potential of the voltages VDD and GND) are applied to the first buffer BUF1 and the second buffer BUF2. A voltage level of the middle potential driving voltage HVDD may correspond to about one half of the high potential driving voltage VDD and may be substantially equal to a common voltage Vcom applied to the display panel 10 (shown in FIG. 4).

The first buffer BUF1 includes a first input unit PI operating by the high potential driving voltage VDD and the ground level voltage GND and a first output unit PO operated by the high potential driving voltage VDD and the middle potential driving voltage HVDD. The second buffer BUF2 includes a second input unit NI operated by the high potential driving voltage VDD and the ground level voltage GND and a second output unit NO operated by the high potential driving voltage VDD and the middle potential driving voltage HVDD.

A first dynamic current DIDD1 is discharged from the first output unit PO, or a second dynamic current DIDD2 enters the first output unit PO through a switching operation of the first output unit PO. Further, a third dynamic current DIDD3 is discharged from the second output unit NO, or a fourth dynamic current DIDD4 enters the second output unit NO through a switching operation of the second output unit NO. In the embodiment disclosed herein, when a high gray level image is implemented, the first and third dynamic currents DIDD1 and DIDD3 enter the data lines through output channels CH1 and CH2. Further, when a low gray level image is implemented, the second and fourth dynamic currents DIDD2 and DIDD4 flow from the data lines via the output channels CH1 and CH2.

The source driver 12 may further include first to fourth polarity inversion switches OS1, OS2, OS3, and OS4. On-time of the first and fourth polarity inversion switches OS1 and OS4 and on-time of the second and third polarity inversion switches OS2 and OS3 may alternate with each other in a cycle of one sub-frame. When the first and fourth polarity inversion switches OS1 and OS4 are turned on in odd-numbered sub-frames of one frame for the low speed drive, the second and third polarity inversion switches OS2 and OS3 may be turned on in even-numbered sub-frames of the one frame for the low speed drive.

For example, in the 30 Hz interlaced low speed drive, as shown in FIG. 11, the first and fourth polarity inversion switches OS1 and OS4 are turned on in the first sub-frame SF1 and are turned off in the second sub-frame SF2. On the other hand, in the 30 Hz interlaced low speed drive, the second and third polarity inversion switches OS2 and OS3 may be turned off in the first sub-frame SF1 and may be turned on in the second sub-frame SF2. The embodiment of the disclosure may reduce the number of first digital-to-analog converters P-DAC and the number of second digital-to-analog converters N-DAC to one half through an alternate operation of the polarity inversion switches OS1, OS2, OS3, and OS4.

The related art source driver has a structure, in which a static current SIDD frequently flows between an input terminal of the high potential driving voltage VDD and the first buffer BUF1 and between the second buffer BUF2 and an input terminal of the ground level voltage GND. Because the related art has the structure in which the static current is typically generated irrespective of a reduction in a data transition frequency according to the low speed drive, the related art has a limitation of a sharp reduction in power consumption of the source driver.

Referring back to FIG. 10, the embodiment of the invention includes a first power switch SW1 connected between the input terminal of the high potential driving voltage VDD and the first output unit PO and a second power switch SW2 connected between the input terminal of the ground level voltage GND and the second output unit NO, so as to completely shut off the static current SIDD in the skip period of each sub-frame.

The first and second power switches SW1 and SW2 are turned on or off in response to the buffer operation control signal LITEST input (described above with reference to FIG. 8) from the first control logic unit of the timing controller 11 (described above with reference to FIG. 4). As shown in FIG. 11, the first and second power switches SW1 and SW2 are turned on in response to the buffer operation control signal LITEST of the on-level LV2 during a scan period PSCAN of each sub-frame and are turned off in response to the buffer operation control signal LITEST of the off-level LV1 during a skip period PSKIP of each sub-frame. When the first and second power switches SW1 and SW2 are turned off during the skip period PSKIP of each sub-frame, a current path, through which the static current can flow, is interrupted or broken. Thus, the static current flowing between the input terminal of the high potential driving voltage VDD and the first buffer BUF1 and the static current flowing between the second buffer BUF2 and the input terminal of the ground level voltage GND are completely shut off in the skip period PSKIP of each sub-frame.

Figure 12:
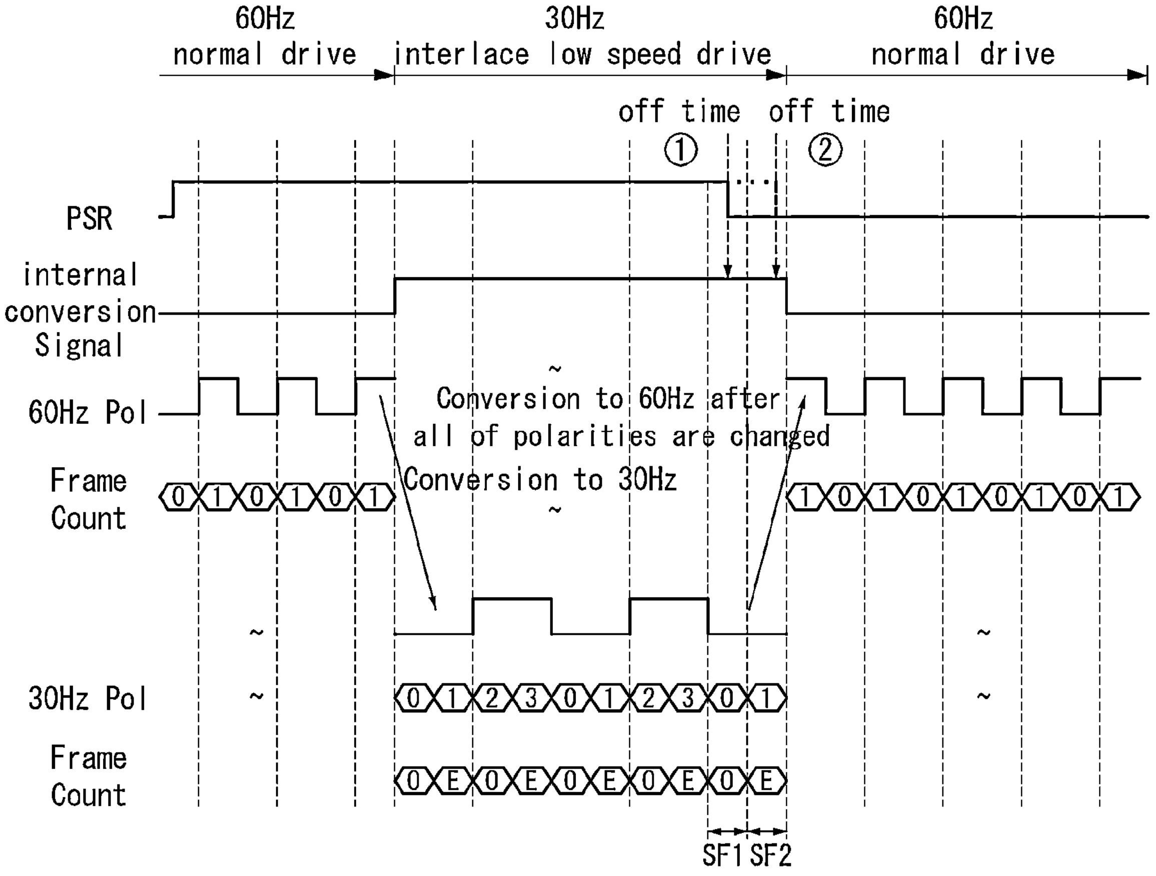
FIG. 12 illustrates an operation of a timing controller capable of suppressing a glitch phenomenon generated when an interlaced low speed driving mode is converted into a normal driving mode.

FIG. 12 illustrates an operation of the timing controller 11 capable of suppressing the glitch phenomenon generated when the interlaced low speed driving mode is converted into the normal driving mode.

As shown in FIG. 12, when the PSR control signal of the off-level is input in a predetermined sub-frame of one frame for low speed drive during the interlaced low speed drive, the second control logic unit of the timing controller 11 detects a next sub-fame of the predetermined sub-frame as a conversion standby sub-frame and controls the operation of the driver units 12 and 13. Hence, the second control logic unit scans all of display lines, which are not scanned until the predetermined sub-frame of the one frame period for the low speed drive, in the conversion standby sub-frame.

For this, the second control logic unit includes a frame counter and may have an off-time detector which decides how many sub-frames of the one frame exist before the predetermined sub-frame of the one frame for the low speed drive.

When the predetermined sub-frame is decided as a previous sub-frame of a last sub-frame of the one frame for the low speed drive, the second control logic unit controls the operation of the driver units 12 and 13 in the normal driving manner for the normal drive immediately after the conversion standby sub-frame is finished.

For example, when the PSR control signal of the off-level is input at off-time ① shown in FIG. 12, the second control logic unit determines using the off-time detector, that a sub-frame, to which the off-time ① belongs, is the first sub-frame SF1 of the one frame period for the low speed drive. Further, the second control logic unit detects a next sub-frame (i.e., the second sub-frame SF2) of the first sub-frame SF1 as the conversion standby sub-frame. The second control logic unit scans all of the display lines, which are not scanned until the first sub-frame SF1, in the second sub-frame SF2 and converts the low speed driving mode into the normal driving mode after the conversion standby sub-frame is finished.

When the predetermined sub-frame is decided as the last sub-frame of the one frame for the low speed drive, the second control logic unit skips a detection operation of the conversion standby sub-frame and controls the operation of the driver units 12 and 13 in the normal driving manner for the normal drive immediately after the predetermined sub-frame is finished.

For example, when the PSR control signal of the off-level is input at off-time ② shown in FIG. 12, the second control logic unit determines using the off-time detector, that a sub-frame, to which the off-time ② belongs, is the last sub-frame (i.e., the second sub-frame SF2) of the one frame period for the low speed drive. Further, the second control logic unit skips the detection operation of the conversion standby sub-frame and converts the low speed driving mode into the normal driving mode after the second sub-frame SF2 is finished.

Figure 13:
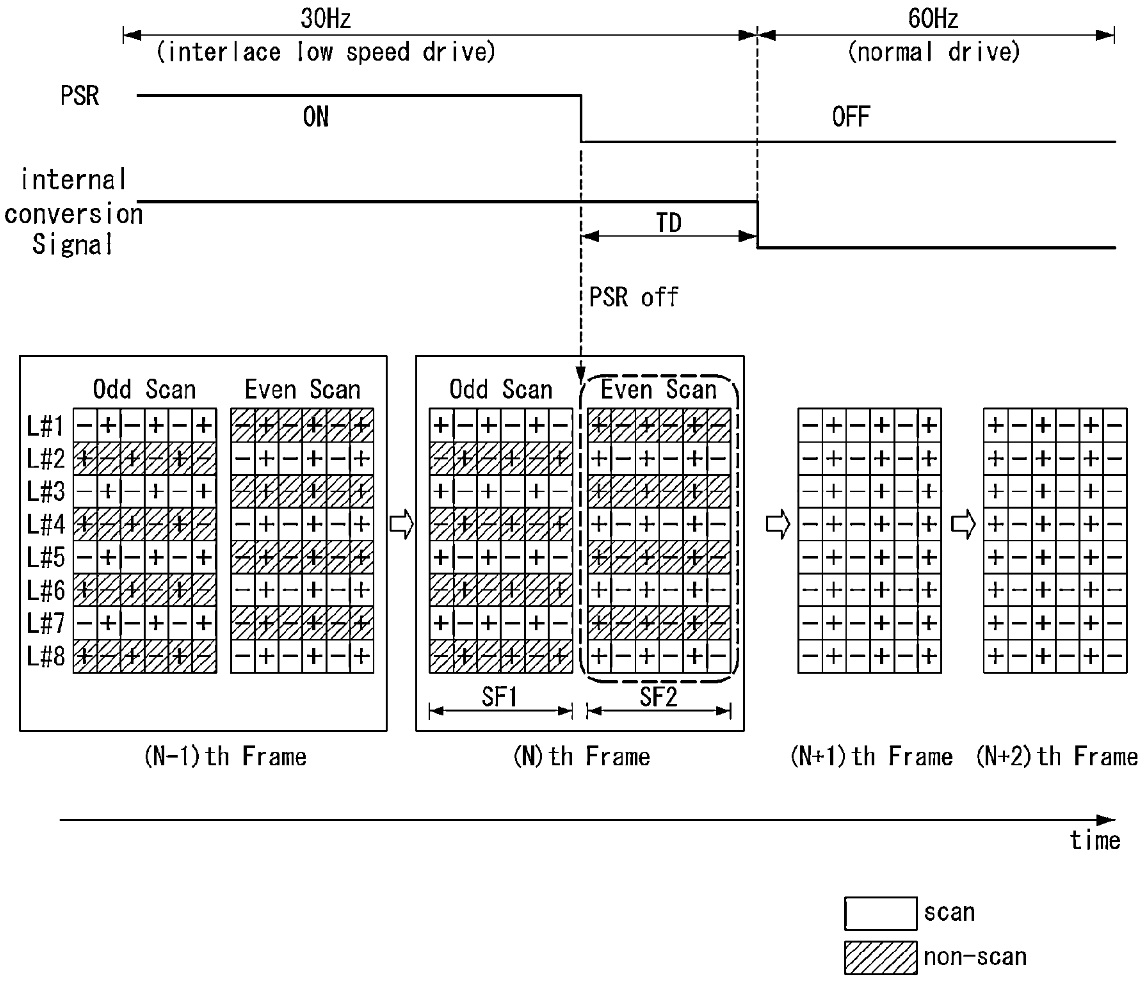
FIGS. 13 and 14 illustrate an operation effect of an exemplary embodiment of the invention capable of suppressing a glitch phenomenon by preventing a polarity repeat phenomenon when a frame frequency is changed at an off-time ① shown in FIG. 12.
Figure 14:
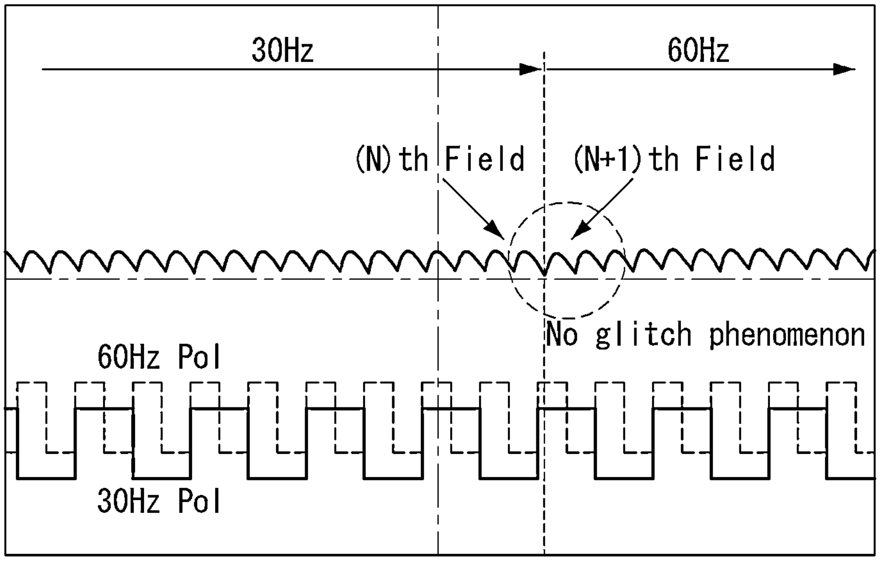

FIGS. 13 and 14 illustrate an operation effect of the embodiment of the disclosure capable of suppressing the glitch phenomenon by preventing a polarity repeat phenomenon when a frame frequency is changed at the off-time ① shown in FIG. 12.

As shown in FIG. 13, the second control logic unit according to the embodiment of the invention determines that a sub-frame, to which the off-time ① belongs, is the first sub-frame SF1 of the one frame period for the low speed drive in response to the PSR control signal of the off-level (input at the off-time ①), and detects the next sub-frame (i.e., the second sub-frame SF2) of the first sub-frame SF1 as the conversion standby sub-frame. Further, the second control logic unit scans all of even-numbered display lines, which are not scanned until the first sub-frame SF1, in the second sub-frame SF2 and converts the low speed driving mode into the normal driving mode after the conversion standby sub-frame is finished. In the related art, because the driving mode is converted into the normal driving mode immediately after a sub-frame, to which the off-time ① belongs, a polarity repeat phenomenon was generated in some of the display lines. However, the second control logic unit according to the embodiment of the disclosure does not convert the low speed driving mode into the normal driving mode immediately after a predetermined sub-frame, to which the off-time ① belongs, and produces an internal conversion signal. Hence, mode conversion timing is delayed by a predetermined period of time (i.e., one sub-frame) TD corresponding to a length of a next sub-frame of the predetermined sub-frame. The second control logic unit scans all of display lines, which are not scanned until the predetermined sub-frame, to which the off-time ① belongs, in the next sub-frame (i.e., the conversion standby sub-frame) of the predetermined sub-frame, and then converts the low speed driving mode into the normal driving mode. Therefore, the polarity repeat phenomenon is prevented. Namely, the second control logic unit completely changes polarities of all of the display lines in an Nth frame and then converts the low speed driving mode into the normal driving mode.

Figure 1:
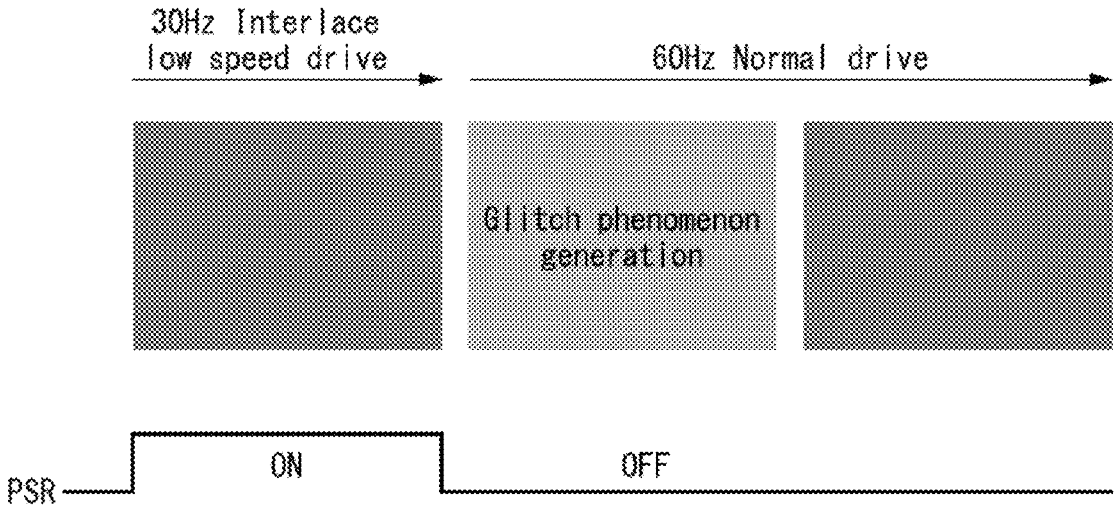
FIG. 1 (RELATED ART)
FIGS. 1 and 2 show an example of a glitch phenomenon generated when an interlaced low speed driving scheme is converted into a normal driving method.
Figure 2:
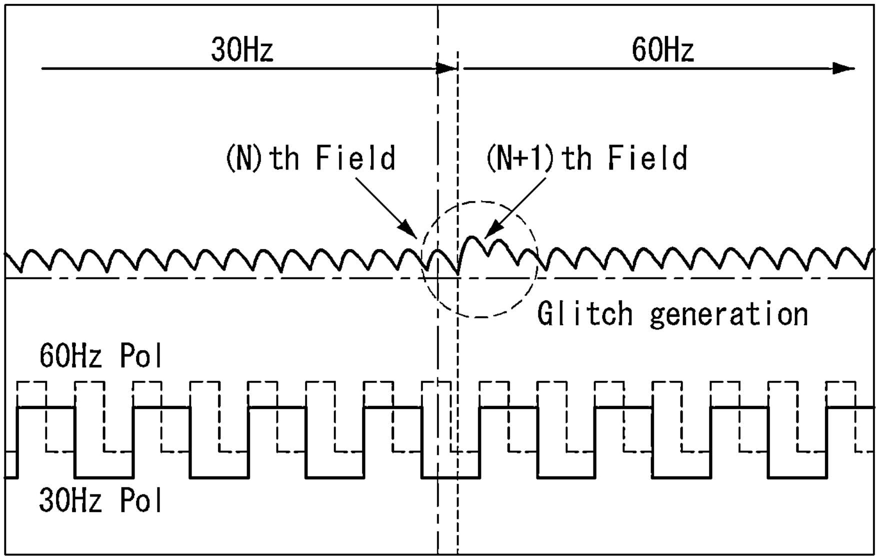
FIG. 2 (RELATED ART)
Figure 3:
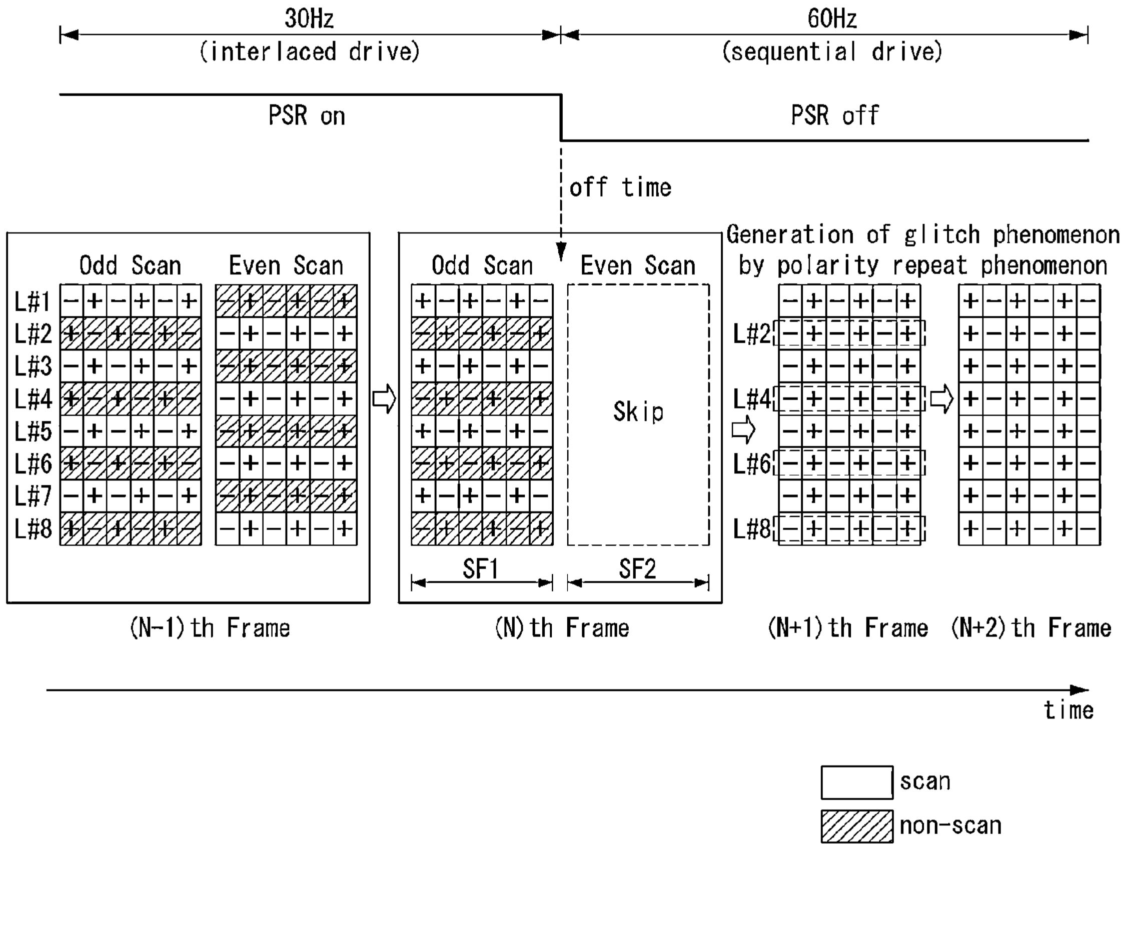
FIG. 3 (RELATED ART)
FIG. 3 illustrates an explanation (e.g., based on a polarity repeat phenomenon) of why a glitch phenomenon is generated when a frame frequency is changed in a related art display device.

As described above, and as shown in FIG. 13, the second control logic unit changes polarities of all of the remaining display lines in the second sub-frame SF2 serving as the conversion standby sub-frame in the Nth frame and then converts the driving mode into the normal driving mode. Therefore, the second control logic unit prevents the polarity repeat phenomenon from being generated in an (N+1)th frame when the driving mode is converted. As a result, in contrast to the illustration of FIG. 2, as shown in FIG. 14, the embodiment of the disclosure may achieve the same or substantially the same luminance (or mean luminance) corresponding to the same data voltage in the Nth frame and the (N+1)th frame, when transitioning between driving frequencies (e.g., when the frame frequency changes from 30 Hz to 60 Hz). Thus, the glitch phenomenon resulting from a luminance difference is prevented.

While FIGS. 12 and 13 show an example where the 30 Hz interlaced low speed driving mode is converted into the 60 Hz normal driving mode, these embodiments are not limited to these frame frequencies.

Figure 15:
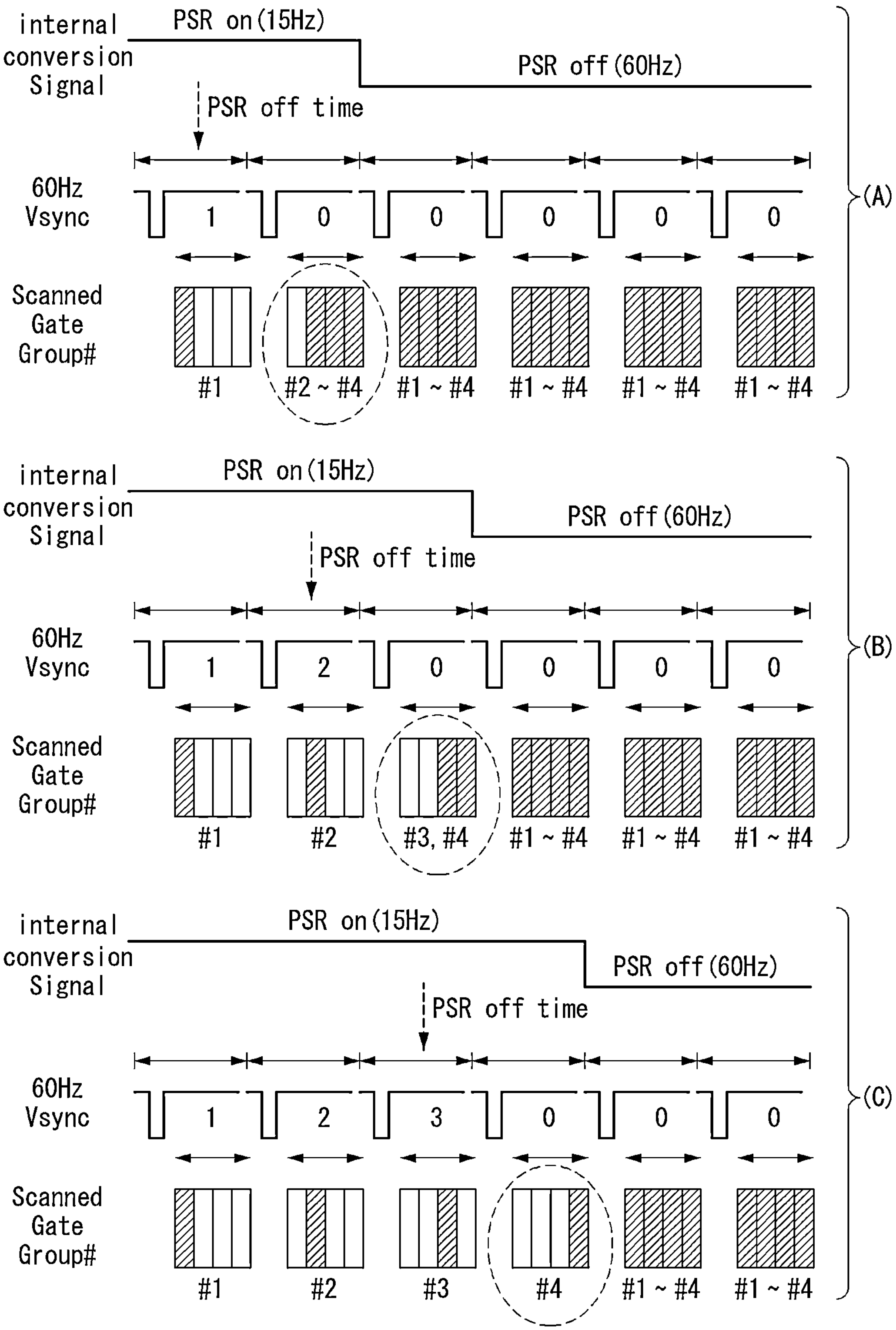
FIG. 15 shows various examples of setting a position of a conversion standby sub-frame depending on a position of a sub-frame of one frame period for low speed drive, in which a panel self refresh (PSR) control signal of an off-level is input.

FIG. 15 shows various examples of setting a position of the conversion standby sub-frame depending on a position of a sub-frame of one frame period for the low speed drive, in which the PSR control signal of the off-level is input. In FIG. 15, the frame frequency in the interlaced low speed driving mode is 15 Hz as an example.

As shown in FIG. 15, one frame for the low speed drive in the interlaced low speed driving mode is divided into four sub-frames.

(4k+1)th display lines corresponding to the first gate group #1 in the display panel 10 are driven in a first sub-frame, where k is a positive integer including zero; (4k+2)th display lines corresponding to the second gate group #2 in the display panel 10 are driven in a second sub-frame; (4k+3)th display lines corresponding to the third gate group #3 in the display panel 10 are driven in a third sub-frame; and (4k+4)th display lines corresponding to the fourth gate group #4 in the display panel 10 are driven in a fourth sub-frame.

As shown in (A) of FIG. 15, when the PSR control signal of the off-level is input in the first sub-frame during the interlaced low speed drive, the embodiment of the disclosure detects the second sub-frame indicated by a circle shown in (A) of FIG. 15 as the conversion standby sub-frame and drives all of the (4k+2)th to (4k+4)th display lines, which are not driven until the first sub-frame, in the second sub-frame at once. Further, the embodiment of the disclosure converts the driving mode into the normal driving mode at the same time as the end of the second sub-frame, so as to advance a mode conversion time point as soon as possible.

As shown in (B) of FIG. 15, when the PSR control signal of the off-level is input in the second sub-frame during the interlaced low speed drive, the embodiment of the disclosure detects the third sub-frame indicated by a circle shown in (B) of FIG. 15 as the conversion standby sub-frame and drives all of the (4k+3)th and (4k+4)th display lines, which are not driven until the second sub-frame, in the third sub-frame at once. Further, the embodiment converts the driving mode into the normal driving mode at the same time as the end of the third sub-frame, so as to advance a mode conversion time point as soon as possible.

As shown in (C) of FIG. 15, when the PSR control signal of the off-level is input in the third sub-frame during the interlaced low speed drive, the embodiment detects the fourth sub-frame indicated by a circle shown in (C) of FIG. 15 as the conversion standby sub-frame and drives all of the (4k+4)th display lines, which are not driven until the third sub-frame, in the fourth sub-frame. Further, the embodiment converts the driving mode into the normal driving mode at the same time as the end of the fourth sub-frame, so as to advance a mode conversion time point as soon as possible.

As described above, when the mode conversion control signal is input in the predetermined sub-frame during the interlaced low speed drive, the embodiment of the invention detects a next sub-frame of the predetermined sub-frame as the conversion standby sub-frame and scans all of the display lines, which are not scanned until the predetermined sub-frame of one frame for the low speed drive, in the conversion standby sub-frame at once. Afterwards, the driving mode is converted into the normal driving mode. Hence, the embodiment of the invention prevents the polarity repeat phenomenon generated when the driving mode is converted, thereby suppressing the glitch phenomenon resulting from the luminance difference.

Furthermore, the embodiment adjusts one gate time and the rising time of the scan pulse during the interlaced low speed drive, thereby completing the scanning operation during a portion (i.e., the scan period) of each sub-frame. Further, the embodiment prevents the static current of the source driver from being generated during the remaining period (i.e., the skip period) of each sub-frame, thereby greatly reducing power consumption. Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device capable of driving at low speed, which changes a frame frequency in response to a mode conversion control signal, the display device comprising:

a display panel, on which display lines each including a plurality of pixels are formed;

a driver unit configured to drive the plurality of pixels; and a timing controller configured to control an operation of the driver unit in one of a normal drive mode of a first frame frequency ($F_1$) and an interlaced low speed drive mode of a second frame frequency ($F_2=F_1/n$) and configured to display an image on the display panel, the timing controller including a first control logic unit and a second control logic unit, wherein responsive to the mode conversion control signal transitioning to an on-level during display of a motion image in the normal drive mode, in which a duration of one frame is set to P:

the first control logic unit increases a duration of one frame for an image to be displayed in the low speed drive mode to (n×P), where n is a positive integer equal to or greater than 2, the first control logic unit assigns a duration of P to each of n sub-frames included in the one frame of the image for the low speed drive mode, and the first control logic unit controls operation of the driver unit in the interlaced low speed drive mode, and wherein responsive to the mode conversion control signal transitioning from the on-level to an off-level during a predetermined sub-frame of the one frame of the image being displayed during the interlaced low speed drive mode:

the second control logic unit generates a next sub-frame of the one frame of the image, for display after the predetermined sub-frame, as a conversion standby sub-frame, the second control logic unit controls the operation of the driver unit in the interlaced low speed drive mode for a duration of the conversion standby sub-frame, and the second control logic unit scans remaining display lines of the one frame of the image, which were not scanned previously until the predetermined sub-frame, in the conversion standby sub-frame.

2. The display device of claim 1, wherein the second control logic unit includes an off-time detector which has a frame counter and the second control logic unit determines a number of sub-frames of the one frame that existed before the predetermined sub-frame of the one frame for the low speed drive mode.

3. The display device of claim 2, wherein when the predetermined sub-frame is determined as a previous sub-frame of a last sub-frame of the one frame for the low speed drive mode, the second control logic unit controls the operation of the driver unit in the normal drive mode immediately after the conversion standby sub-frame is finished.

4. The display device of claim 2, wherein responsive to the predetermined sub-frame being determined to be a last sub-frame of the one frame for the low speed drive mode, the second control logic unit skips a generation operation for generating the conversion standby sub-frame and controls the operation of the driver unit in the normal drive mode immediately after the predetermined sub-frame is finished.

5. The display device of claim 1, wherein the driver unit includes a gate driver for driving gate lines of the display panel and a source driver for driving data lines of the display panel, wherein for the interlaced low speed drive mode, the first control logic unit groups the gate lines into n gate groups, controls an operation of the gate driver in each sub-frame, completes a scanning operation of the gate lines belonging to the corresponding gate group during a scan period occupying a portion of one sub-frame, generates a buffer operation control signal, and shuts off a driving power source applied to buffers of the source driver based on the buffer operation control signal during a skip period corresponding to a remaining period excluding the scan period from the one sub-frame.

6. The display device of claim 5, wherein for the interlaced low speed drive mode, the first control logic unit changes a polarity control signal, expands a polarity inversion period of a data voltage for input to the display panel, to one frame for the low speed drive mode, controls an operation of the source driver, outputs the data voltage to the data lines during the scan period, and skips an output of the data voltage during the skip period.

7. The display device of claim 6, wherein the source driver outputs the data voltages of opposite polarities through adjacent output channels in a column inversion scheme and inverts a polarity of each output channel in a cycle of one frame for the low speed drive mode in response to the polarity control signal.

8. The display device of claim 5, wherein for the interlaced low speed drive mode, the scan period occupies 1/n of each sub-frame, and the skip period following the scan period occupies (n−1)/n of each sub-frame.

9. The display device of claim 5, wherein for the interlaced low speed drive mode, the first control logic unit sets one gate time required to scan one gate line in each sub-frame to '1H' defined by the length P of one sub-frame/the number of gate lines and sets a duration between rising edges of adjacent scan pulses scanned in an interlaced scheme in one sub-frame to '1H', so as to secure the skip period in the interlaced low speed drive.

10. The display device of claim 5, wherein a scanning operation of the gate driver and a data voltage supply operation of the source driver are skipped during the skip period of each sub-frame.

* * * * *